No. 735,528. Patented August 4, 1903.

UNITED STATES PATENT OFFICE.

JAMES EUGENE KIRKPATRICK, OF TAUNTON, ENGLAND.

MANUFACTURE OF BRICKS FOR FURNACES.

SPECIFICATION forming part of Letters Patent No. 735,528, dated August 4, 1903.

Application filed May 16, 1903. Serial No. 157,477. (No specimens.)

*To all whom it may concern:*

Be it known that I, JAMES EUGENE KIRKPATRICK, a subject of the King of Great Britain, residing at Taunton, in the county of Somerset, England, have invented certain new and useful Improvements in the Manufacture of Bricks and Compositions Capable of Withstanding Very High Temperatures and for Use in Steel and other Furnaces, of which the following is a full, clear, and exact description.

The invention has for its object the manufacture of basic magnesite bricks and magnesite compositions for use in steel and other furnaces.

I employ crude magnesite—such, for example, as that found in Salem and other parts of India, the composition of which is approximately as follows: magnesium carbonate, 90.56; magnesium oxid, 7.64; silicon oxid, 0.97; aluminium oxid, 0.32; iron oxid, 0.19; loss and water combined, 0.32; total, one hundred. The reason for using this description of magnesite is the very small proportion of silicon, iron, and aluminium contained therein. Hence the greater basicity of the brick or composition, also the small proportion of lime, is an advantage, as the bricks on cooling from high temperatures have not the tendency to split in the manner those do which are made from magnesite containing large quantities of lime.

This invention consists of the hereinafter-described method of treating magnesite of the description before mentioned to utilize it in the manufacture of bricks and other compositions or formations for use in basic-steel and other furnaces.

My invention only deals with magnesite of the purity described. The less pure magnesite existing in many countries containing large quantities of silicon, alumina, iron, and lime can without any special preparation or treatment be made into bricks, &c., and kiln-burnt; but they are greatly inferior in quality to those made from magnesite of the great purity herein first referred to.

Now according to this invention crude magnesite, such as herein first described, is first dead burnt in either an electric, rotary, or any other furnace or kiln in which a temperature ranging from 1,000° to 2,000° centigrade may be obtained to free it from carbon dioxid and any other volatile or organic impurities it may contain. If desired, this part of the process may be carried to the fusion-point of the substance—that is to say, the effect of fusing the substance does not injure its properties for the purpose for which it is to be used; but it is not absolutely necessary to continue the dead-burning until fusion takes place. This dead-burnt substance is then crushed either to a fine powder or to a powder of a coarser nature suitable for the various purposes for which the final product is to be used. In the manufacture of bricks of the ordinary dimensions the quantity of the fine powder to be mixed with the coarse is not more than from one to two per cent.; but in the manufacture of large slabs or bricks the quantity will vary in accordance with the size of the slab or brick; but in any case the largest proportion possible of the coarse is used, as this insures greater refractory properties and greater strength in the final product. This crushed dead-burnt magnesite is now exposed to the atmosphere in a suitable shed or room for a period of at least forty-eight hours. This part of the process may be continued for a longer period; but extreme care must be taken to safeguard against the absorption of too great a quantity of carbon dioxid. If from overexposure to the atmosphere a very large proportion of this gas is absorbed, the bricks will show cracks and other defects after kilning. During such exposure the crushed dead-burnt magnesite is to be frequently turned over by hand or mechanical means, so as to expose all portions equally during such exposure. This is most essential to the working of the process, for if this turning over of the material is not carried out and the top layer is taken by itself and made into bricks on kilning such bricks will fall to pieces in an almost pulverulent state. Hence by neglect of this important matter the whole kiln of brick may be rendered useless from defects in shape, &c. The crushed dead-burnt magnesite after such exposure is intimately mixed with a small proportion—say from one to ten per cent. of its weight—of sodium pyroborate, commonly known as "sodium" biborate or "borax," or the native borax of India, known as "tinkal," "tincal," or "tinstone," may be used after such purification as may be necessary in order not to materially increase the amount of iron, silicon, aluminium, or calcium contained in the original magnesite. The amount of borax or tinstone used may vary according to the purpose for which the brick, &c., is intended to be used. Water is now added to this mixture of dead-burnt magnesite and sodium pyroborate, and it is of extreme importance that the quantity of water used should only be sufficient to moisten the mixture, so that it may be conveniently handled in a mass. If a larger quantity than necessary is used, the brick, &c., will in the process of drying give off the excess of water with such rapidity as to render the brick, &c., unsound from cracks and other defects in its internal parts. This mass may then be molded *in situ*, or it may be molded to the necessary shape by the usual methods employed in molding ordinary clay. The molded substance is now subjected to a drying process. The temperature of the drying-room or stove should not greatly exceed 100° Fahrenheit. I find that drying-rooms such as are in use in the manufacture of ordinary clay bricks, in which the exhaust-steam from the boilers employed in such works is used for the purpose, are very suitable for the purpose of drying these bricks. The time allowed for drying ordinary-sized bricks is generally from twelve to twenty-four hours. As soon as this part of the process is complete the bricks, &c., are immediately subjected to hydraulic or other similar pressure and may then be burned either *in situ* or in an ordinary well-constructed kiln, an electric furnace, or by any other method in which a sufficiently-high temperature can be obtained.

I am well aware that it has previously been proposed to manufacture bricks from native magnesite of the purity to which this process is applicable, but not in the manner herein prescribed, and the difficulty to contend with has been that the small proportion of easily-fusible materials contained in this native mineral is not sufficient to hold the particles together when manipulated by ordinary methods and that the addition of silicon, silicon fluorid, alumina, iron, &c., destroyed the object to be attained—namely, the preservation of the great basicity of the final product for the important purpose it is intended to be used—*i. e.*, primarily the lining of basic-steel furnaces—whereas by manipulation of the substance in the manner herein described, with the addition of a suitable quantity of that easily-fusible substance borax, this difficulty is overcome, and the finished product has still the same basicity as the original native magnesite.

In the process of burning this composition the sodium pyroborate or borax not only acts as an easily-fusible mineral salt, simply holding the finely-granulated atoms or granules of magnesite together, but chemical combination takes place. This may be demonstrated by subjecting a portion of such brick to the temperature at which sodium pyroborate is fusible and gradually raising the same to the temperature at which the magnesite itself becomes fusible, and on subsequent cooling and decomposition with acids the reaction given by the metal boron is evidenced on the application of the usual chemical tests.

Having now particularly described and ascertained the nature of my said invention and in what manner the same is to be performed, I declare that what I claim is—

1. The manufacture of bricks and compositions capable of withstanding very high temperatures from crude magnesite of a high degree of purity such as that found in many parts of Southern India by the following process, viz: first, dead-burning the magnesite to free it from carbon dioxid and any other volatile or organic impurities it may contain; second, crushing the dead-burnt magnesite to powder; third, exposing the crushed dead-burnt magnesite to the atmosphere and frequently turning it over; fourth, mixing the crushed dead-burnt magnesite after exposure to the air with a small proportion of its weight of borax; fifth, adding only sufficient water to the material to enable it to be conveniently handled in a mass; sixth, molding the mass to the required shape; seventh, drying the molded mass; and, eighth, burning the dried molded mass at a high temperature; substantially as herein set forth.

2. The manufacture of bricks and compositions capable of withstanding very high temperatures from crude magnesite of a high degree of purity, such as that found in many parts of Southern India, by the following process, viz: first, dead-burning the magnesite to free it from carbon-dioxid and any other volatile or organic impurities it may contain; second, crushing the dead-burnt magnesite to powder; third, exposing the crushed dead-burnt magnesite to the atmosphere and frequently turning it over; fourth, mixing the crushed dead-burnt magnesite, after exposure to the air, with a small proportion of its weight of borax; fifth, adding only sufficient water to the material to enable it to be conveniently handled in a mass; sixth, molding the mass to the required shape; seventh, drying the molded blocks; eighth, subjecting the molded blocks to great pressure; and, ninth, burning the pressed molded blocks at a high temperature; substantially as herein set forth.

In testimony whereof I have signed my name to this specification in the presence of two subscribing witnesses.

JAMES EUGENE KIRKPATRICK.

Witnesses:
PEARD CLARKE,
JAMES SHAIRCROSS.